US011351823B2

United States Patent
Khandelwal et al.

(10) Patent No.: US 11,351,823 B2
(45) Date of Patent: Jun. 7, 2022

(54) HYBRID TOWING BUMPER BEAM ASSEMBLY

(71) Applicant: SABIC GLOBAL TECHNOLOGIES B.V., Bergen op Zoom (NL)

(72) Inventors: Ratnesh Khandelwal, Bangalore (IN); Dinesh Munjurulimana, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 339 days.

(21) Appl. No.: 16/469,952

(22) PCT Filed: Dec. 15, 2017

(86) PCT No.: PCT/EP2017/083158
§ 371 (c)(1),
(2) Date: Jun. 14, 2019

(87) PCT Pub. No.: WO2018/109211
PCT Pub. Date: Jun. 21, 2018

(65) Prior Publication Data
US 2019/0359019 A1    Nov. 28, 2019

(30) Foreign Application Priority Data
Dec. 16, 2016   (IN) .............................. 201641043082

(51) Int. Cl.
*B60D 1/56*       (2006.01)
*B60R 19/18*      (2006.01)
*B60D 1/24*       (2006.01)
*B60D 1/48*       (2006.01)

(52) U.S. Cl.
CPC .............. *B60D 1/565* (2013.01); *B60R 19/18* (2013.01); *B60D 1/243* (2013.01); *B60D 1/485* (2013.01);
(Continued)

(58) Field of Classification Search
CPC .................................. B60D 1/56; B60D 1/565
See application file for complete search history.

(56) References Cited

U.S. PATENT DOCUMENTS

| 6,179,320 B1 | 1/2001 | Chou et al. |
| 6,502,848 B1 | 1/2003 | Chou et al. |

(Continued)

FOREIGN PATENT DOCUMENTS

| DE | 202009006554 U1 | 9/2010 | |
| FR | 2835793 A1 * | 8/2003 | ............. B60R 19/18 |

(Continued)

OTHER PUBLICATIONS

International Search Report; International Application No. PCT/EP2017/083158; International Filing Date: Dec. 15, 2017; dated Mar. 27, 2018; 4 pages.

(Continued)

*Primary Examiner* — Kevin Hurley
(74) *Attorney, Agent, or Firm* — Cantor Colburn LLP

(57) ABSTRACT

Hybrid energy absorbing assembly for attachment to a vehicle for a vehicle, comprising a bumper beam comprising a plastic material; and a towing assembly, wherein the towing assembly comprises a metal insert. The invention also relates to a metal insert for such a hybrid energy absorbing assembly. Moreover, the invention relates to a vehicle provided with such a hybrid towing bumper beam assembly, wherein the metal insert is connected to a body-in-white of the vehicle. Furthermore, the invention relates to a method for manufacturing such a hybrid towing bumper beam assembly for a vehicle, the method comprising placing the metal insert in a mold; introducing molten thermoplastic material, to a mold to in site form the energy absorbing (Continued)

assembly and thus overmolding the metal insert with the thermoplastic material, thereby embedding the metal insert in the bumper beam.

19 Claims, 8 Drawing Sheets

(52) U.S. Cl.
CPC ........ *B60D 1/488* (2013.01); *B60R 2019/184* (2013.01)

(56) References Cited

U.S. PATENT DOCUMENTS

| | | |
|---|---|---|
| 2004/0262931 A1 | 12/2004 | Roussel et al. |
| 2007/0182170 A1* | 8/2007 | Renault ................... B60D 1/56 293/102 |

FOREIGN PATENT DOCUMENTS

| | | |
|---|---|---|
| FR | 2866830 A1 | 9/2005 |
| FR | 3021921 A1 | 12/2015 |
| KR | 101517723 B1 * | 5/2015 |

OTHER PUBLICATIONS

Written Opinion; International Application No. PCT/EP2017/083158; International Filing Date: Dec. 15, 2017; dated Mar. 27, 2018; 5 pages.

* cited by examiner

HYBRID TOWING BUMPER BEAM ASSEMBLY

CROSS REFERENCE TO RELATED APPLICATIONS

This application is a 371 of International Application No. PCT/EP2017/083158, filed Dec. 15, 2017, which is incorporated by reference in its entirety, and which claims priority to Indian Application Serial No. 201641043082, filed Dec. 16, 2016.

BACKGROUND OF THE INVENTION

Field of the Invention

The present invention relates to a hybrid towing bumper beam assembly, comprising a metal insert and a bumper rear beam. The invention also relates to a metal insert for a bumper rear beam. Furthermore, the invention relates to a method of manufacturing such a hybrid towing bumper beam assembly.

Description of the Related Art

A bumper beam assembly, in particular a rear bumper beam assembly, is part of every motor vehicle for protection against low speed vehicle collision condition. Such bumper beam assemblies are designed in such a way that they absorb a large portion of the energy during collision. The rear bumper assembly typically includes a beam that extends transversely across the rear end of the motor vehicle.

Metals have been in used for both bumpers and tow assemblies, because of their high rigidity. However, due to recent regulations and to increased fuel efficiency, recent focus has been on reducing the weight of the vehicle while maintaining reduced damage to vehicles in low-speed collisions. In the case of low-speed collisions, energy absorbing assemblies can be used in bumpers and can absorb collision energy to reduce vehicle damage.

Varying performance requirements for vehicles have been established by organizations such as the United States Department of Transportation National Highway Traffic Safety Administration (NHTSA), Insurance Institute for Highway Safety (IIHS), the Research Council for Automobile Repairs (RCAR), and the Economic Commission for Europe (ECE). Regulations governing the low-speed damageability requirements for automobiles across the globe are different. For example, in Europe and the Pacific region, vehicles have to meet ECE 42 and RCAR standards at both the front and rear of the vehicle. In the U.S., vehicles have to pass other deformable barrier impact tests such as those set by NHTSA and IIHS.

To validate the structural performance of any rear bumper beam, a test is conducted wherein the rear of the vehicle at its middle axis is subjected to an impact against a fixed 7-inch diameter pole, at a speed of 4 km/h (kilometers per hour). Bumper beams are designed in such a way that the impactor penetration is limited to the extent that the bumper beam is still spaced at least 10-15 mm from the back panel of the body-in-white (BIW) after the impact but at the same time absorbing the maximum amount of energy.

To enable the vehicle for towing, a separate tow hitch assembly may be equipped to the bumper beam or to rear end of the vehicle. The tow hitch assembly typically includes a tow hitch receiver which is welded to a transverse tubular cross member and the tubular cross member is mounted to a frame of the motor vehicle through a pair of mounting brackets. In many cases, the provision for the towing assembly is made in the rear beam itself.

Nowadays, there are plastic bumper beams in use which are designed solely for ECE R 42 impact collisions. For these plastic bumper beams, a separate provision is required for connecting the tow assembly to the BIW through the rail extension zone. One of the issues occurring in this situation is the damage the tow assembly might cause to the tail light with an uncontrolled movement of the vehicle during towing. All the current plastic beam meeting the low speed impact requirement of ECE R 42 usually do not cater to the towing requirement for the beam to perform well under pull load of the 80-90% of the vehicle weight.

It would therefore be desirable to provide a bumper beam assembly with a towing assembly that alleviated at least some of the perceived inconveniences of the prior art.

BRIEF SUMMARY OF THE INVENTION

According to the invention, there is provided a hybrid energy absorbing assembly for attachment to a vehicle for a vehicle, comprising:
a bumper beam comprising a plastic material; and
a towing assembly,
wherein the towing assembly comprises a metal insert.

Preferably, the metal insert is at least partially embedded in the bumper beam to form an integral unit. Alternatively, the metal insert may be provided separately with the bumper beam and is connected to the bumper beam subsequently.

The metal-plastic hybrid rear bumper beam offers, in comparison to existing metal systems, a weight reduction of 45-50% and significant cost advantage through part integration and reduced cycle time.

An energy absorbing assembly including a crash can, a protrusion and a connecting bumper beam can provide a light-weight energy absorbing system that can efficiently absorb impact energy associated with vehicle collisions with another vehicle, an object, etc.

It can be expensive to repair vehicle components including the tailgate, engine components, bumper, or lights damaged during low or moderate speed collisions. There are many specifications a bumper assembly can meet, including regional safety specifications, national safety specifications and internal development specifications. These specifications can vary between locations (e.g., United States and Europe) where the vehicle is sold. Thus, it can be desirable for an energy absorbing assembly to meet most global bumper safety requirements.

An energy absorbing assembly including a crash can, a protrusion and a connecting bumper beam as described here can meet most global bumper safety requirements, e.g., ECE R 42 center pendulum tests and/or RCAR 10 degree 40% overlap 15 km/h impact tests. As used herein the RCAR impact tests are based upon RCAR Low-speed structural crash test protocol—Issue 2.2, July 2011; and the ECE R42 center pendulum tests are based upon ECE R 42 uniform provision concerning the approval of vehicles with regard to their front and rear protective devices—date of entry into force as an annex to the agreement 1 June 1980.

In the current invention, a metal-plastic hybrid solution is introduced, wherein the metal insert with its metal stiffness properties provides a major contribution to the tow load requirement. The bumper beam surrounding the metal insert is also designed to contribute to majority of the tow load requirement without impacting the plastic bumper beam locally around the insert during towing. Here, the metal insert can also be used separately as single metal piece without coming in contact with the plastic beam. In this way the tow load is fully transferred to the body of the vehicle through the rail extension, where the metal insert is attached to. It is preferred that the metal insert is embedded in the bumper beam through overmolding. Thus the plastic material is overmolded over a pre-made metal insert.

The bumper beam may comprise a first end portion and a second end portion and a center portion contiguous with and oriented between the first end portion and the second end portion, wherein the center portion comprises a front side and a back side; and/or
  a first crash can extending from the first end portion of the bumper beam, the first crash can including a cavity formed by sides extending from a first attachment face, with a first protrusion projecting forward from the attachment face toward the front side of the bumper beam, and the first crash can extending behind the back side of the bumper beam at the first end portion; and/or
  a second crash can extending from the second end portion of the bumper beam, the second crash can including a cavity formed by sides extending from a second attachment face, with a second protrusion projecting forward from the front side of the bumper beam, and the second crash can extending behind the back side of the bumper beam at the second end portion.

The assembly may further comprise a first crash can extending from the first end portion of the bumper beam, the first crash can including a cavity formed by sides extending from a first attachment face, with a first protrusion projecting forward from the attachment face toward the front side of the bumper beam, and the first crash can extending behind the back side of the bumper beam at the first end portion; and a second crash can extending from the second end portion of the bumper beam, the second crash can including a cavity formed by sides extending from a second attachment face, with a second protrusion projecting forward from the front side of the bumper beam, and the second crash can extending behind the back side of the bumper beam at the second end portion.

The metal insert may comprise a receiving portion for receiving a towing tool, wherein the receiving portion is enclosed by the bumper beam, and wherein the bumper beam comprises a receiving opening aligned with an opening at a first side of the towing assembly.

The metal insert may further comprise a connecting portion for connecting the metal insert to the vehicle, wherein the connecting portion is situated at a second side of metal insert. The connection to the vehicle may be at a body of the vehicle. The connection may be established with a bolt, a weld, or any other suitable connecting means.

The energy absorbing assembly can be attached to a vehicle via the crash cans. The crash cans include an attachment portion for facilitating a fixed connection of the assembly to a vehicle body. The attachment portion includes an attachment face that acts as the connection area to the vehicle body. The connection between the energy absorbing assembly and a vehicle can be a mechanical attachment, (e.g., screws, bolts, and/or nuts), using attachment holes in the attachment face, or any other suitable joining technique. Each attachment portion of a crash can may align with a vehicle rail.

The towing assembly may further comprise the towing tool. The towing tool can be a towing hook or loop or the like, to connect a towing rope or cable, etc., to the vehicle.

According to an embodiment, the bumper beam has a longitudinal axis and the towing assembly positioned off center along the longitudinal axis in the bumper beam. The metal insert may be positioned adjacent one of the first and second end portions of the bumper beam. The center portion may be a curved portion arced in a direction orthogonal to a lengthwise direction of the bumper beam. Preferably, the bumper beam is integral with the first crash can and second crash can. The first protrusion may be integral with the first crash can and the second protrusion may be integral with the second crash can. According to an embodiment, the hybrid energy absorbing assembly is a single element.

The energy absorbing assembly can include a beam including a first end and a second end, where the beam includes a curved portion contiguous with and oriented between the first end and the second end. The curved portion can be arced in a direction orthogonal to a lengthwise direction of the beam. The angle (θ) of arc is dependent upon packing space, and desired energy absorption characteristics. For example, the angle (θ) can be 10 degrees (°) to 40°, e.g., 10° to 30° or 15° to 25°. The beam has a front side and a back side. The curve at the front side and the curve at the back side of the curved portion can be the same or different. The curved portion can be arced in a regular manner or can include sections with more or less arc than other sections. The curved portion can include flat or relatively flat (i.e., curve less than ±5 degrees) sections. The beam can include a flat or relatively flat portion in the center at the front side and back side, or a flat or relatively flat portion in the center of the front side or the back side. The beam can be curved along its length such that the beam is convex (e.g., extending outward such that when attached to a vehicle, the beam extends away from the vehicle toward top wall). The beam can have a center portion that has a smaller curve angle when viewed from the top than the portion at the first and second ends. The beam can have a center portion that matches the angle of a testing device. The beam can have a center portion that matches the angle of the ECE R 42 pendulum impact testing device.

The beam can be of any width from the front side to the back side when viewed from the top, to provide the desired energy absorption characteristics of the energy absorbing assembly, and to meet the space requirements of the vehicle. The beam width can vary through the length of the beam, or the beam width can be the same through the length of the beam. The ends of the beam can be wider than the center of the beam. The width can be chosen to provide the desired fabrication methods such as injection molding. Typically, the width can vary from 10 mm to 100 mm at the center of the beam, and can vary from 50 mm to 300 mm at the end of the beam. The mass of the beam can vary from 0.8 kilograms (Kg) to 4 Kg. The beam includes a first crash can extending from the first end of the beam and a second crash can extending from the second end of the beam. Each crash can has a protrusion that projects from the rear of the can, forward from the front side of the can at each end. The protrusions can extend from the front side of the crash can a distance that is less than or equal to a center portion of the beam (as is illustrated by line 58 in FIG. 1). Although the protrusions can extend beyond the center portion, such a design is generally not employed for aesthetic reasons. The amount of the protrusion that extends forward from the front side of the beam at each end can be selected to provide the desired amount of energy absorption from, an impact test, such as an offset impact test, or for other considerations.

Each crash can extends behind the back side of the beam at each end. The amount of the crash can that extends behind the back side of the beam at each end can be selected to allow the desired amount of energy absorption, the desired space between the beam and the vehicle, to allow the beam (namely the crash cans) to attach directly to the vehicle rails, and/or for other considerations.

The first crash can and the second crash can each may include an attachment portion for facilitating a fixed connection of the assembly to a vehicle body, the attachment portion comprising an attachment face and an attachment hole. In addition to these attachment portions of the crash cans, the connection portion of the metal insert may connect to the vehicle body to have a transfer of the towing (loading) force from the towing tool to the vehicle body.

It is preferred that each attachment portion, preferably including the connection portion of the metal insert, aligns with a vehicle rail.

According to an embodiment, the first crash can and second crash can each comprise a honeycomb structure.

The beam can have one or more portions along a height direction. The beam can have an upper portion, a middle portion and a bottom portion. Each portion can be separated by a wail. As an example, the beam can be formed from the following portions viewing from the top of the beam down: a top wall and a mid-wall, forming the upper portion; two mid-walls forming the middle portion; and a mid-wall and bottom wall forming the bottom portion. The walls, portions and other components can be any thickness or width that provides the desired energy absorbing characteristics, fabrication characteristics, or other considerations. The beam can have more than one middle portion.

The beam can include one or more closed or open portions at the front side and one or more closed or open portions at the back side. In an example, the top wall has a solid front face, the bottom wall has a solid front face, and the mid wall has a solid back face, forming an alternating open-closed structure proceeding down the beam.

The top wall, mid-wall and bottom wall can be connected using one or more ribs. Ribs can be disposed between the walls and can provide structural reinforcement (e.g., rigidity, torsional stiffness, and the like) to the beam, which in turn can reduce deflection of the energy absorption assembly during a vehicle collision. The ribs can be the depth of the walls to which the ribs are connected. The ribs can be straight or curved, or any other suitable shape. Ribs can extend between the walls across the length of the beam. Ribs disposed between the top wall and a mid-wall, between two mid-walls, and between a mid-wall and the bottom wall, and can be substantially parallel to each other (e.g., nearly 180 degrees apart from one another), and orthogonal to the walls. The ribs can be configured to be aligned between at least one of the upper portion, the middle portion, and the bottom portion, or the ribs can be configured to be offset from each other in the upper portion, middle portion and/or bottom portion (e.g., in a staggered arrangement). The ribs in the upper portion and the bottom portion can be aligned with each other or offset from each other. The ribs can form a space between the walls. This space can be of varying size. The size can provide controlled and efficient energy absorption. In an embodiment, the upper portion, bottom portion and middle portion can each independently include more than one row of ribs. For example, the upper portion, bottom portion and middle portion can each independently include greater than or equal to two rows of ribs; greater than or equal to three rows of ribs; greater than or equal to four rows of ribs; and greater than or equal to five rows or ribs. The ribs can be any shape that will provide the desired stiffness to the energy absorbing assembly and allow it to absorb energy and protect the vehicle components located behind the energy absorbing assembly from damage. Typically distance between each rib can vary from 10 mm to 40 mm. The thickness of the ribs can vary from 1.5 mm to 6 mm. In order to optimize both the weight (i.e. minimize the weight) and the performance (i.e. deliver up to the requirements), the thickness of the material for both the metal insert and the bumper beam need to optimized. As such, the thickness of the metal insert material may vary over the length and/or width of the device. Additionally, the thickness of the plastic material of the bumper beam may vary at various locations, i.e. the thickness of the material at the front side may vary along the longitudinal direction of the bumper beam, being relatively thin at the respective end portions and increasing towards the curved portion to a relatively thick material.

The energy absorbing assembly can comprise any polymeric material or combination of polymeric materials that can be formed into the desired shape and provide the desired properties. Exemplary materials include polymeric materials as well as combinations of polymeric materials with elastomeric materials, and/or thermoset materials. In one embodiment, the polymeric materials comprise thermoplastic materials. Possible polymeric materials include polybutylene terephthalate (PBT); acrylonitrile-butadiene-styrene (ABS); polycarbonate (LEXAN™ and LEXAN™ EXL resins, commercially available from SABIC); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC); blends of polycarbonate/PET/PBT; PBT and impact modifier (XENOY™ resins, commercially available from SABIC); polyamides; phenylene sulfide resins; polyvinyl chloride PVC; high impact polystyrene (HIPS); low/high density polyethylene (L/HDPE); polypropylene (PP); expanded polypropylene (EPP); polyethylene and fiber composites; polypropylene and fiber composites (AZDEL Superlite™ sheets, commercially available from Azdel, Inc.); long fiber reinforced thermoplastics (VERTON™ resins, commercially available from SABIC) thermoplastic olefins (TPO), and carbon fiber reinforced polymeric composites (CFRP), as well as combinations comprising at least one of the foregoing.

An exemplary filled resin is STAMAX™ resin, which is a long glass fiber filled polypropylene resin also commercially available from SABIC. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced polymeric composites can be utilized to form the energy absorbing assembly. Carbon fiber reinforced polymeric composites can be used as a coating (e.g., skin) on the energy absorbing assembly or portions thereof to provide the desired structural integrity to the energy absorbing assembly. The energy absorbing assembly can be formed from combinations comprising at least one of any of the above-described materials. For example, in some embodiments, the same material can be used to make each component of the energy absorbing assembly (e.g. the crash cans, beam, ribs and/or protrusions). In other embodiments, different materials can be used to make the various components of the energy absorbing assembly (e.g., one material can be used to make the crash cans and a different material can be used to make the ribs and a different or the same material can be used to make the protrusions). It is contemplated that any combination of materials can be used to, e.g., enhance crush characteristics, reduce damageability, etc.

A fascia can surround the energy absorbing assembly such that the assembly will not be visible once attached to the vehicle. The fascia can be formed from a thermoplastic material and can undergo a finishing process utilizing conventional vehicle painting and/or coating techniques. The fascia may have a through-hole aligned with the receiving opening of the metal insert, so a towing tool may be received in the receiving opening through the fascia.

When attached to a vehicle, the energy absorbing assembly can be attached to the vehicle rails via the attachment face. The energy absorbing assembly is located between the fascia and the vehicle rails. With this design, no additional bumper beam is needed. In other words, the vehicle can be free of a metal bumper beam. The energy absorbing assembly can attach directly to the fascia and to the vehicle rails.

An energy absorbing assembly can absorb impact energy at low and/or moderate speeds. It can be used for vehicles to minimize the damage to the vehicles and/or pedestrians during low-speed and/or moderate-speed impacts. The energy absorbing assembly is designed to start crushing upon an impact force of greater than or equal to 5 kiloNewtons (kN). In other words, in some embodiments, the energy absorbing assembly can start crushing when impacted with a force of 5 kN. In another embodiment, the energy absorbing assembly can starts crushing when impacted with a force of 10 kN. In yet another embodiment, the energy absorbing assembly can starts crushing when impacted with a force of 20 kN. In yet another embodiment, the energy absorbing assembly can start crushing when impacted with a force of 60 kN.

The invention also relates to a vehicle provided with a hybrid towing bumper beam assembly as described above, wherein the metal insert is connected to a body the vehicle.

Furthermore, the invention relates to a method for manufacturing a hybrid towing bumper beam assembly for a vehicle as described above, the method comprising:

placing the metal insert in a mold;

introducing molten thermoplastic material to a mold to in situ form the energy absorbing assembly and thus overmolding the metal insert with the thermoplastic material, thereby embedding the metal insert in the bumper beam.

The method may further comprise forming the metal insert from a sheet material. The metal insert may be pre-formed and bought 'of the shelve', or the method comprises a single process including forming and overmolding the metal insert.

According to an embodiment of the method, introducing molten thermoplastic material to a mold comprises injection molding thermoplastic material into the mold.

BRIEF DESCRIPTION OF THE DRAWINGS

The features and advantages of the invention will be further appreciated upon reference to the following drawings of a number of exemplary embodiments, in which:

FIG. 2a shows a perspective view of a metal insert with a tow hook;

FIG. 2b shows another perspective view of the metal insert of FIG. 2a;

DESCRIPTION OF ILLUSTRATIVE EMBODIMENTS

Figure 1:
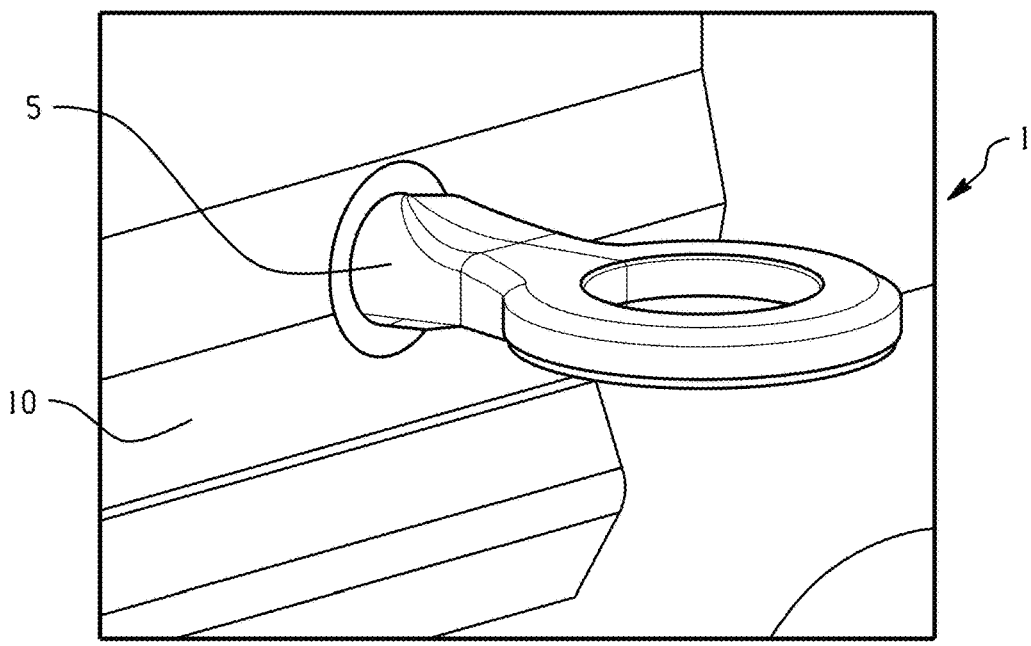
FIG. 1 shows a hybrid towing bumper rear beam assembly according to a first embodiment of the present invention in perspective view.
Figure 2:
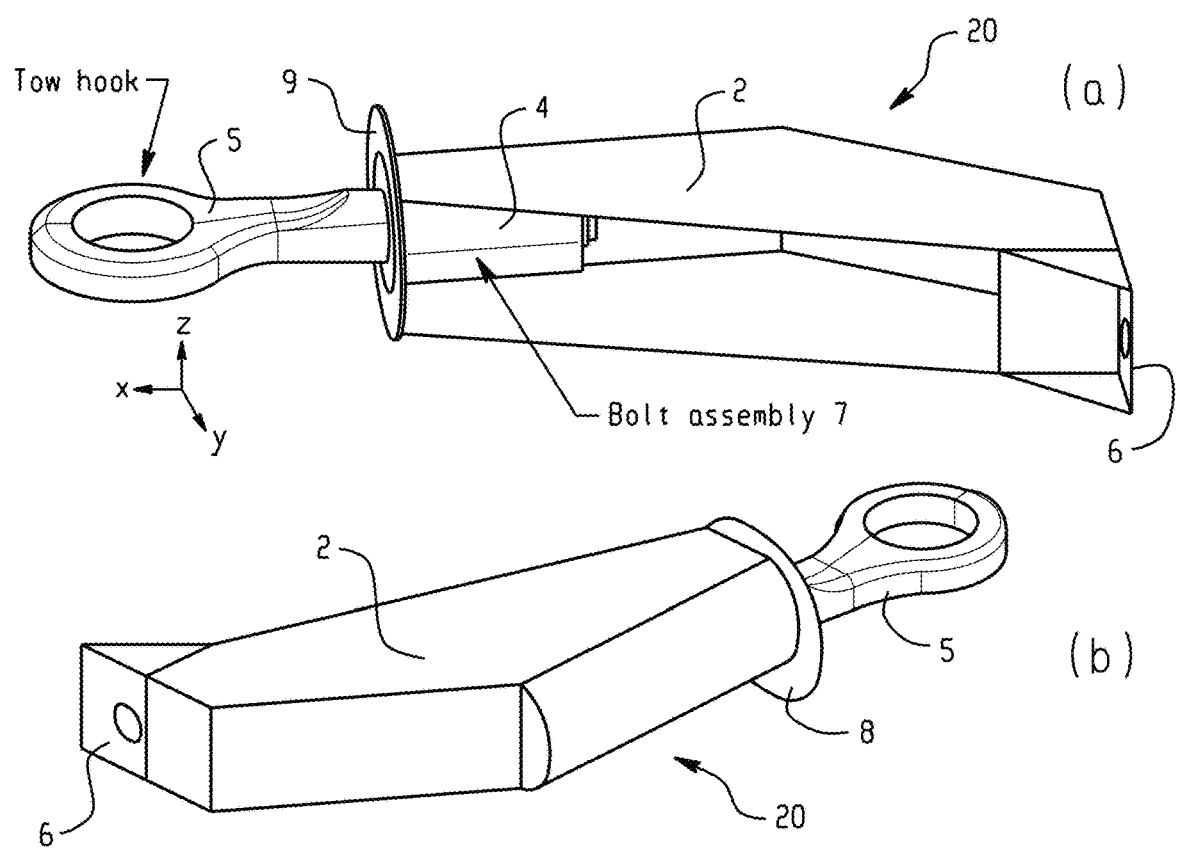
Figure 3:
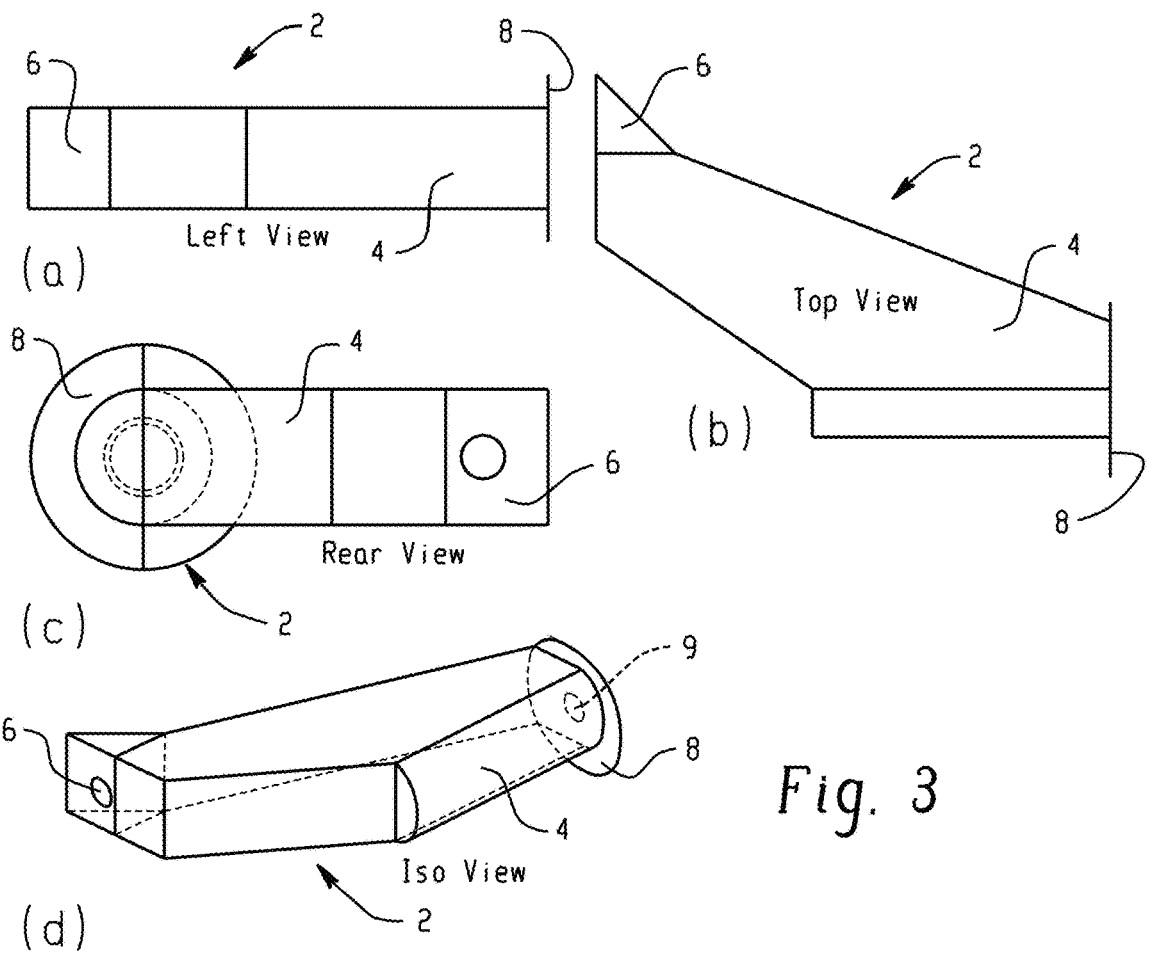
FIGS. 3a to d show several views of the eta insert for the hybrid towing bumper rear beam assembly of FIG. 1.

FIG. 1 shows a hybrid towing bumper rear beam assembly 1 according to a first embodiment of the present invention in perspective view. The hybrid towing bumper rear beam assembly 1 comprises a fascia 10 and a towing hook 5. The towing hook 5 is fastened into a metal insert 2, forming a towing assembly 20, see FIGS. 2a and b. The metal insert 2 has a receiving portion 4, a positioning flange 8 and a connection portion 6. The receiving portion 4 is for receiving and fastening the towing hook 5 to the metal insert 2, for instance by means of a bolt assembly 7. The receiving portion is provided with an opening 9 for insertion of the towing hook 5 into the receiving portion. The connection portion 6 is for connection of the metal insert to a vehicle (not shown), such that the towing assembly is connected to a body of the vehicle (not shown) and thereby transferring the towing load to the body of the vehicle. The positioning flange 8 is used to stabilize the position of the metal insert in the bumper beam 11 (see FIG. 6). FIG. 3 shows several views of the metal insert for the hybrid towing bumper rear beam assembly of FIG. 1, showing the different parts of the metal insert 2.

Figure 4:
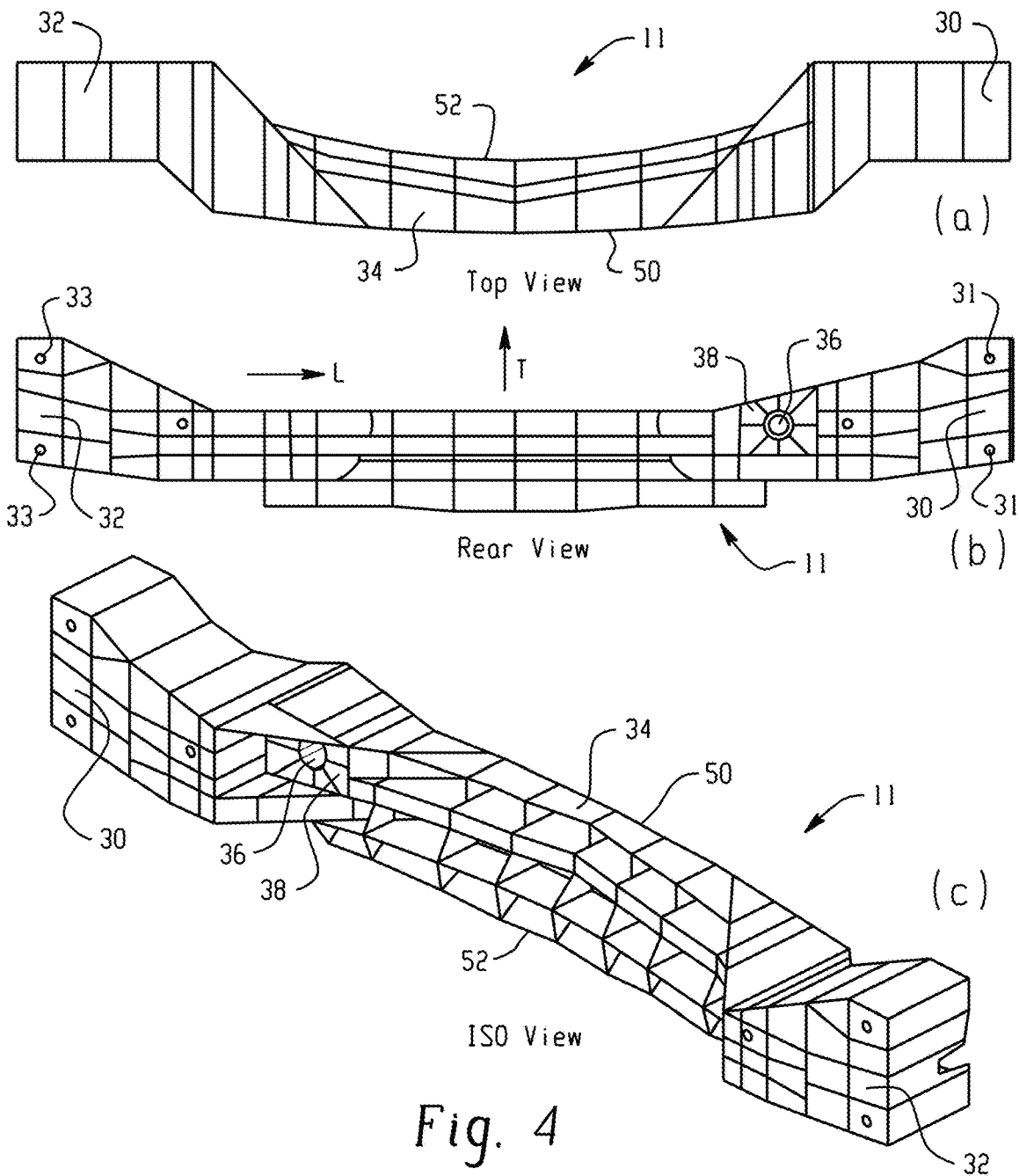
FIGS. 4a to c show several views of the bumper beam for the hybrid towing bumper rear beam assembly of FIG. 1.

FIG. 4a shows a top view of the bumper beam 11 for the hybrid towing bumper rear beam assembly 1. The bumper beam 11 includes a first end 30 and a second end 32. Bumper beam 1 further has a curved portion 34 contiguous with and oriented between the first end 30 and the second end 32. Curved portion 34 has a front side 50 and a back side 52. Curved portion 34 is arced in a direction orthogonal to a longitudinal direction L of the beam. In other words, the bumper beam 11 is arced in a transverse direction T where front side 50 is positioned forward of back side 52. The bumper beam 11 may include a first crash can extending from the first end 30 of the bumper beam 11. The bumper beam 11 may include a second crash can extending from the second end 32 of the bumper beam 11. FIG. 4b shows a rear view of the bumper beam 11, showing the back side 52 of the bumper beam 11. The first and second end portions 30, 32 are provided with attachment portions 31, 33, respectively, for attaching the bumper beam 11 to a vehicle body (not shown). FIG. 4b further shows an insertion portion 38 near and adjacent the first end portion 30, where the metal insert 2 is inserted to form the hybrid towing bumper rear beam assembly 1 (see FIG. 6a). The bumper beam 11 has a receiving opening 36 that is aligned with the opening 9 of the receiving portion 4 of the metal insert 2, such that the towing tool 5 can be received and fastened into the metal insert 2. FIG. 4c shows a perspective view of the bumper beam 11, again showing the back side 52 of the bumper beam 11.

Figure 5:
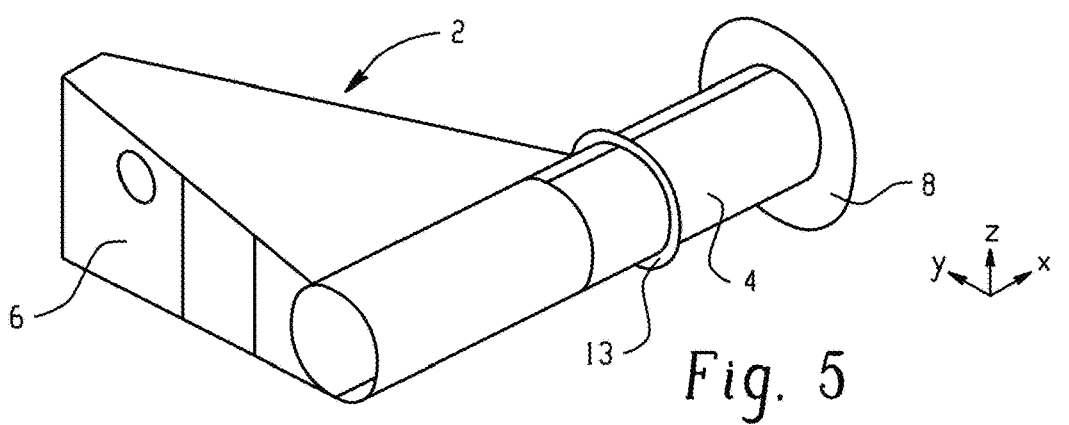
FIG. 5 shows a second embodiment of the metal insert h hybrid towing bumper rear beam assembly according to FIG. 1.

FIG. 5 shows a second embodiment of the metal insert 2 for the hybrid towing bumper rear beam assembly 1 having a first positioning flange 8, a second positioning flange 13, a receiving portion 4 and a connection portion 6.

Figure 6A:
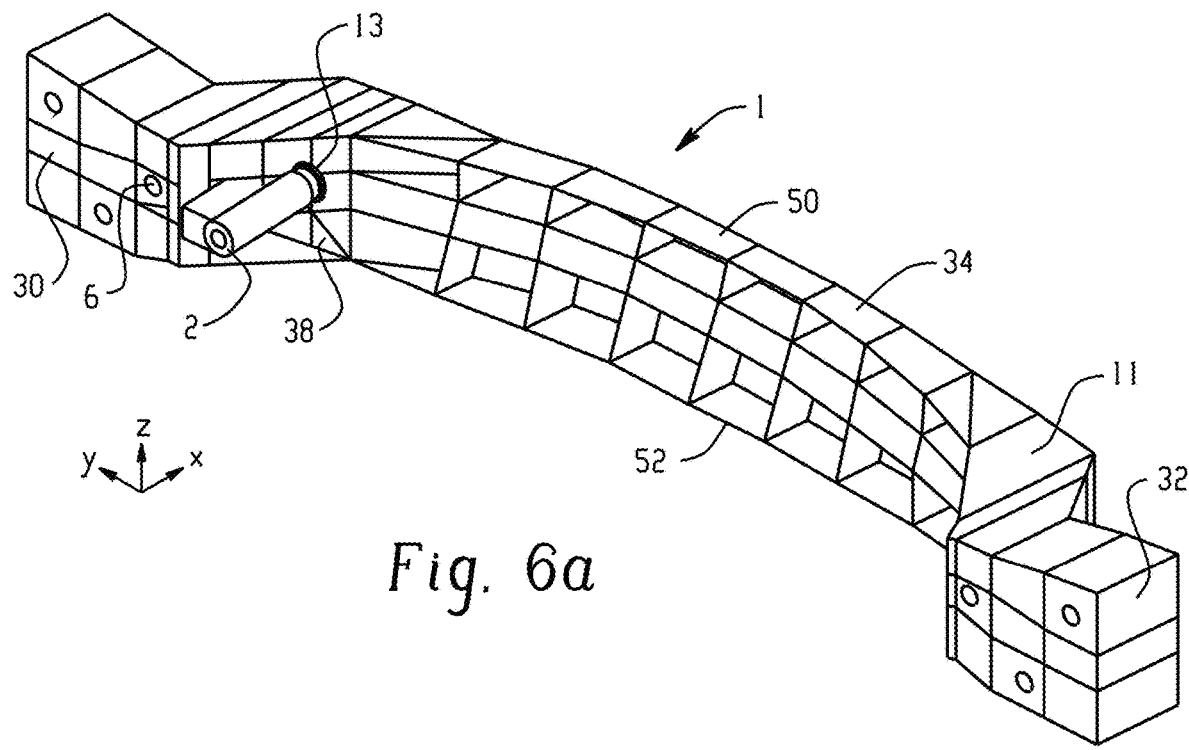
FIGS. 6a to c show several views of a second embodiment of the hybrid towing bumper rear beam assembly of FIG. 1.
Figure 6B:
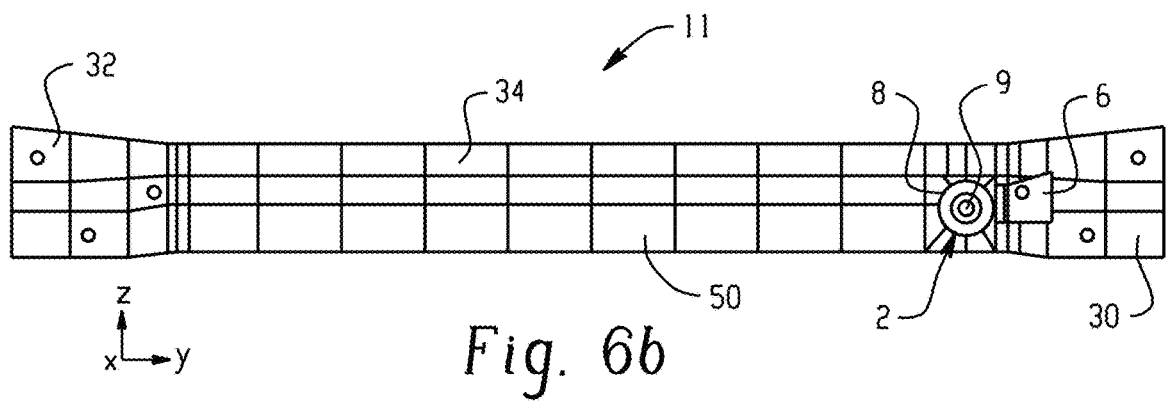
Figure 6C:
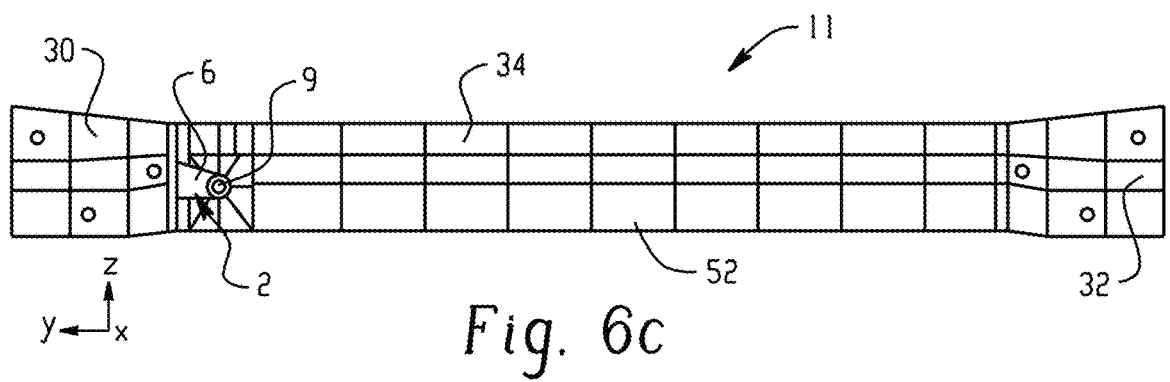

FIGS. 6a to c show several views of a second embodiment of the hybrid towing bumper rear beam assembly 1. The metal insert 2 is embedded in the bumper beam 11 at the insertion location 38. The first and second positioning flanges 8, 13 of the metal insert 2 stabilize the position of the metal insert 2 in the bumper beam 11. The metal insert 2 is located near the first end portion 30 of the bumper beam 11, which is off center in the bumper beam 11. FIG. 6b shows a front view of the hybrid towing bumper rear beam assembly 1 of FIG. 6a, showing the front side 50 of the bumper beam 11. The first positioning flange 8 can be seen, as well as the opening 9 to the receiving portion 4 of the metal insert 2. Additionally, the connection portion 6 for connecting the metal insert 2 to a vehicle body (not shown) can be seen in this view. FIG. 6c shows a rear view of the hybrid towing bumper rear beam assembly 1 of FIGS. 6a and b, showing the back side 52 of the bumper beam and the opening 9 and connection portion 6 of the metal insert 2. The metal insert 2 is adjacent first end portion 30 of the bumper beam 11.

Figure 7:
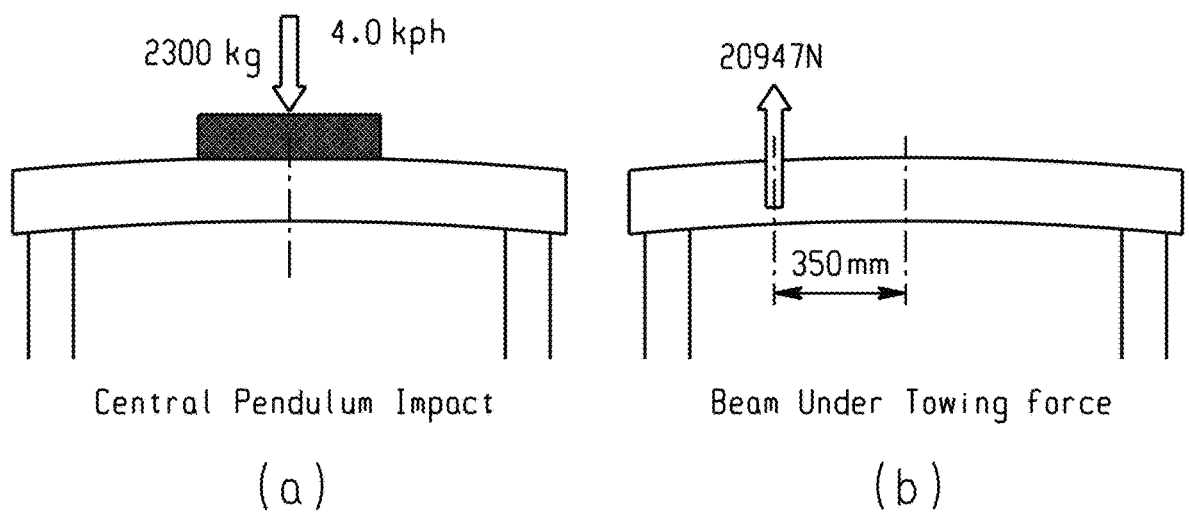
FIG. 7 shows the loading conditions for the hybrid towing bumper rear beam assembly according to the invention.

FIG. 7 shows the loading conditions for the hybrid towing bumper rear beam assembly 1 according to the invention. To show the performance of the hybrid towing bumper rear beam assembly 1, a case study has been conducted wherein the hybrid towing bumper rear beam assembly 1 is designed for a vehicle having a mass of 2300 kg and the hybrid towing bumper rear beam assembly 1 is subjected to two kinds of loading conditions a) Central pendulum impact b) Towing force. The Central Pendulum impact loading condition is according to the ECE R 42 regulation, which ensures that no failure of expensive parts should occur during the impact. Additionally, this requires that intrusion of the impactor should be minimized and should not be touching the back panel of the vehicle body, see FIG. 9, intrusion after impact. The hybrid towing bumper rear beam assembly 1 is designed for towing a roughly 2300 kg vehicle (about 21 kN towing load). During towing, the bumper beam may not fail and deform so as to touch the rear fascia. Also, there should not be any plastic deformation in the beam material during the towing.

Figure 8:
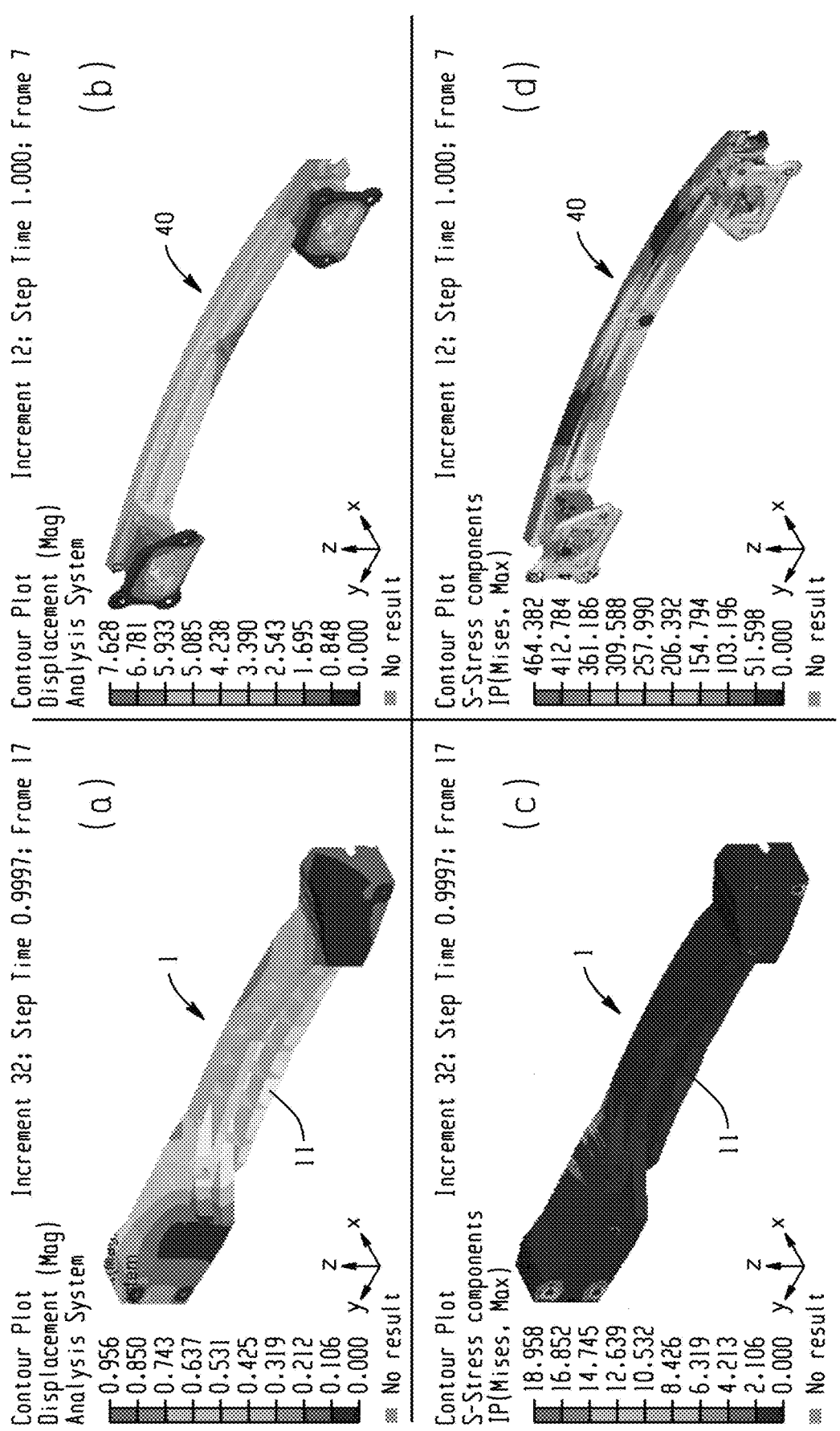
FIG. 8 shows the comparison of stress and deformation for the hybrid towing bumper rear beam assembly according to the invention versus a metal solution according to the prior art.

FIG. 8 shows the comparison of stress and deformation for the hybrid towing bumper rear beam assembly 1 according to the invention versus a metal bumper solution 40 according to the prior art. Both bumper beams are subjected to a load of 20947N along the x axis, i.e. towards the fascia. The final deformation of the bumper beam of the hybrid towing bumper rear beam assembly 1 is significantly reduced compared to the metal bumper beam according to the prior art, thereby proving the effectiveness of the hybrid towing bumper rear beam assembly 1 for towing requirement, FIGS. 8a and b for comparison. Additionally, the amount of stress over the whole bumper beam 11 is much less and much more uniform compared to the metal bumper solution 40, see FIGS. 8c and d for comparison.

Figure 11:
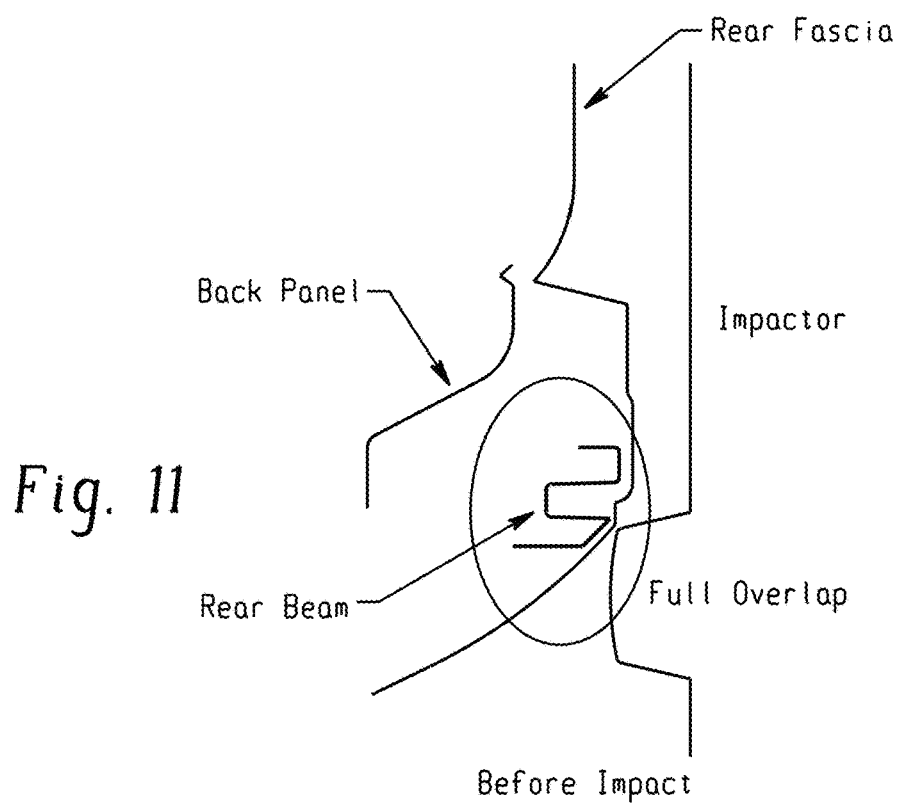
FIG. 11 shows the set-up of the impact test with the Central Pendulum shown in FIG. 7.
Figure 9:
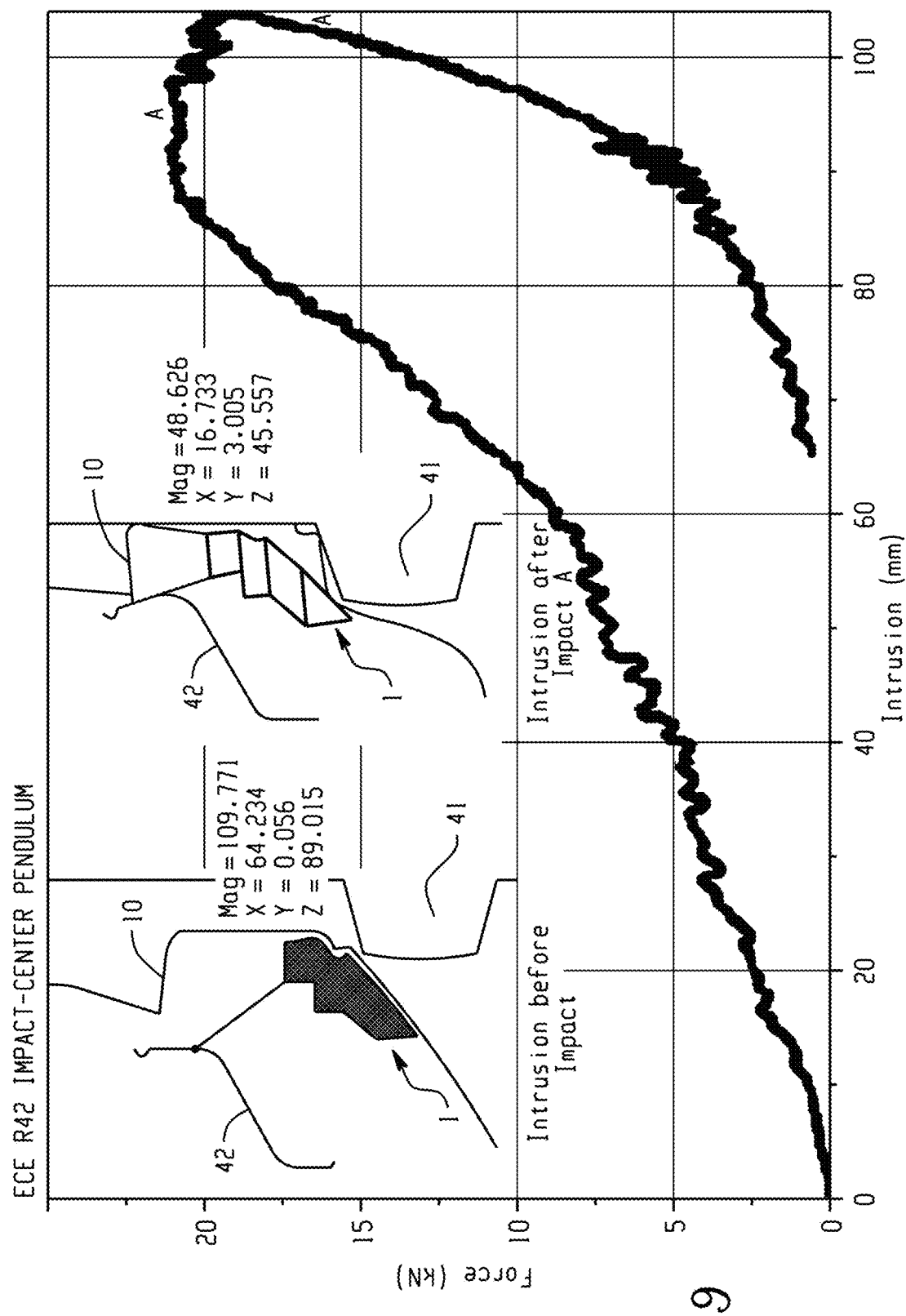
FIG. 9 shows a force (KN) vs intrusion (mm) diagram for the hybrid towing bumper rear beam assembly according to the invention.

FIG. 9 shows a force (KN) vs intrusion (mm) diagram for the hybrid towing bumper rear beam assembly 1 according to the invention. As shown, the intrusion of the impactor 41 after the impact is 16 mm, meaning that the bumper beam 11 is spaced sufficiently from the back panel 42 of the body-in-white (BIW) after the impact, which is fulfilling the requirement of the ECE 42 to minimize failure of expensive parts during the impact. FIG. 11 shows the set-up of the impact test with the Central Pendulum.

Figure 10:
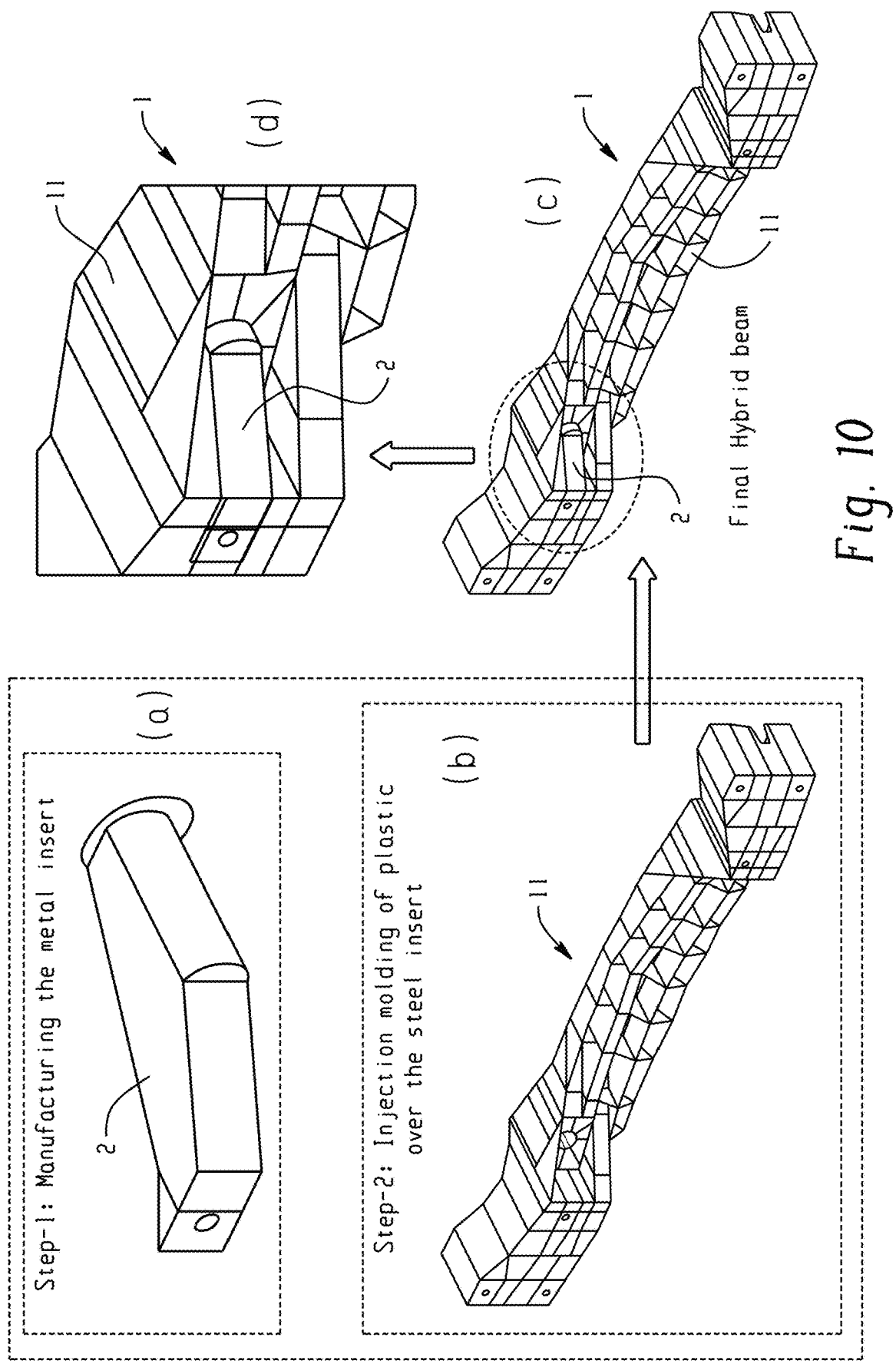
FIGS. 10a-d show the hybrid towing bumper rear beam assembly in different steps of the manufacturing process.

FIG. 10 shows the hybrid towing bumper rear beam assembly in different steps of the manufacturing process. First, a steel sheet is cut to suitably shaped pieces, of which at least one is then stamped/formed to obtain the metal insert 2 as shown in FIG. 10a. Once obtained the metal insert 2 in the desired shape, the metal insert 2 is positioned in a mold of an injection molding machine wherein the plastic material is molded over the metal insert 2 to form the bumper beam 11 over the metal insert 2. After cooling and removing the injection molded part from the mold, the hybrid towing bumper rear beam assembly 1 is obtained see FIG. 10c. An enlargement of the insertion location 38 of the bumper beam 11 with the metal insert 2 is shown in FIG. 10d. Alternatively, the metal insert 2 and the bumper beam 11 are manufactured separately and assembled together of together afterwards to form the hybrid towing bumper rear beam assembly 1.

The invention claimed is:

1. A hybrid energy absorbing assembly for attachment to a vehicle for a vehicle, comprising:
   a bumper beam comprising a plastic material, wherein the bumper beam comprises a first end portion and a second end portion and a center portion contiguous with and oriented between the first end portion and the second end portion, wherein the center portion comprises a front side and a back side;
   a towing assembly, wherein the towing assembly comprises a metal insert;
   a first crash can extending from the first end portion of the bumper beam, the first crash can including a cavity formed by sides extending from a first attachment face, with a first protrusion projecting forward from the attachment face toward the front side of the bumper beam, and the first crash can extending behind the back side of the bumper beam at the first end portion; and
   a second crash can extending from the second end portion of the bumper beam, the second crash can including a cavity formed by sides extending from a second attachment face, with a second protrusion projecting forward from the front side of the bumper beam, and the second crash can extending behind the back side of the bumper beam at the second end portion.

2. The assembly of claim 1, wherein the metal insert is at least partially embedded in the bumper beam.

3. The assembly of claim 1, wherein the metal insert further comprises a receiving portion for receiving a towing tool, wherein the receiving portion is enclosed by the bumper beam, and wherein the bumper beam comprises a receiving opening aligned with an opening at a first side of the towing assembly.

4. The assembly of claim 1, wherein the metal insert further comprises a connecting portion for connecting the metal insert to the vehicle, wherein the connecting portion is situated at a second side of metal insert.

5. The assembly of claim 1, wherein the towing assembly further comprises the towing tool.

6. The assembly of claim 1, wherein the metal insert is embedded in the bumper beam through overmolding.

7. The assembly of claim 1, wherein the bumper beam has a longitudinal axis and the towing assembly is positioned off center along the longitudinal axis in the bumper beam.

8. The assembly of claim 1, wherein the bumper beam comprises a first end portion and a second end portion, symmetrically positioned from a central transverse symmetry axis, wherein the metal insert is positioned adjacent one of the first and second ends.

9. The assembly of claim 1, wherein the center portion is a curved portion arced in a direction orthogonal to a lengthwise direction of the bumper beam.

10. The assembly of claim 1, wherein the bumper beam is integral with the first crash can and second crash can.

11. The assembly of claim 1, wherein the first protrusion is integral with the first crash can and the second protrusion is integral with the second crash can.

12. The assembly of claim 1, wherein the first crash can and the second crash can each include an attachment portion for facilitating a fixed connection of the assembly to a vehicle body, the attachment portion comprising an attachment face and an attachment hole; and wherein each attachment portion aligns with a vehicle rail.

13. The assembly of claim 1, wherein the first crash can and second crash can each comprise a honeycomb structure.

14. The assembly of claim 1, wherein the hybrid energy absorbing assembly is a single element.

15. A vehicle comprising the hybrid energy absorbing assembly according to claim 1.

16. A vehicle provided with a hybrid towing bumper beam assembly, wherein the hybrid towing bumper beam assembly comprises
 a bumper beam comprising a plastic material, and
 a towing assembly, wherein the towing assembly comprises a metal insert, wherein the metal insert is connected to a back panel of the vehicle.

17. A method for manufacturing a hybrid towing bumper beam assembly for a vehicle according to claim 1, the method comprising:
 placing the metal insert in a mold;
 introducing molten thermoplastic material to a mold to in situ form the energy absorbing assembly and thus overmolding the metal insert with the thermoplastic material, thereby embedding the metal insert in the bumper beam.

18. The method of claim 17, wherein introducing molten thermoplastic material to a mold comprises injection molding thermoplastic material into the mold.

19. The method of claim 17, wherein the thermoplastic material is a thermoplastic composite material, comprising a thermoplastic matrix material and filling or reinforcing particles or fibers.

* * * * *